Oct. 11, 1949.  C. B. GARDENIER  2,484,217
GAS FLOW APPARATUS

Filed Feb. 28, 1946  2 Sheets-Sheet 1

INVENTOR
CLYDE B. GARDENIER
BY Henry Lanahan
ATTORNEY

Oct. 11, 1949.  C. B. GARDENIER  2,484,217
GAS FLOW APPARATUS
Filed Feb. 28, 1946  2 Sheets-Sheet 2
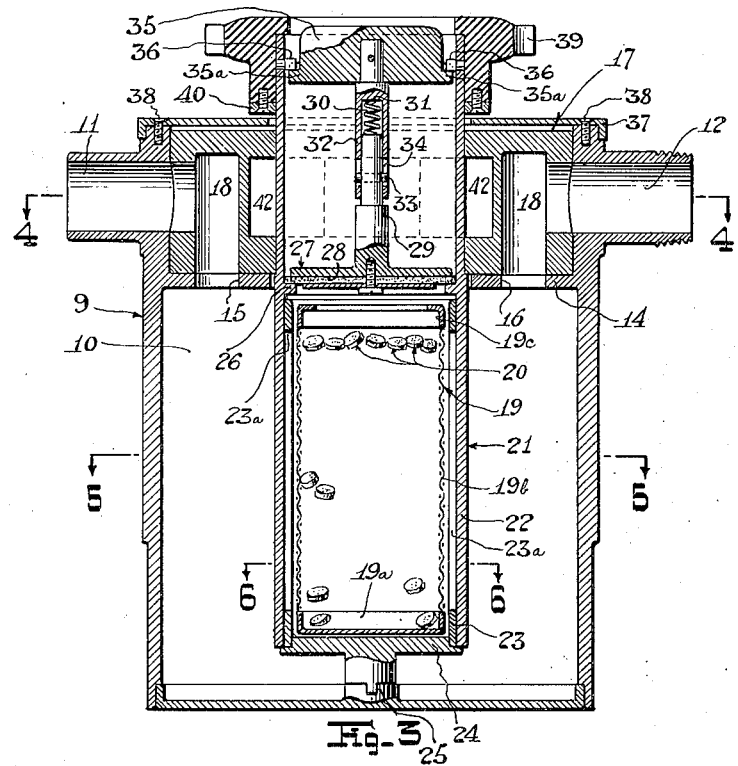
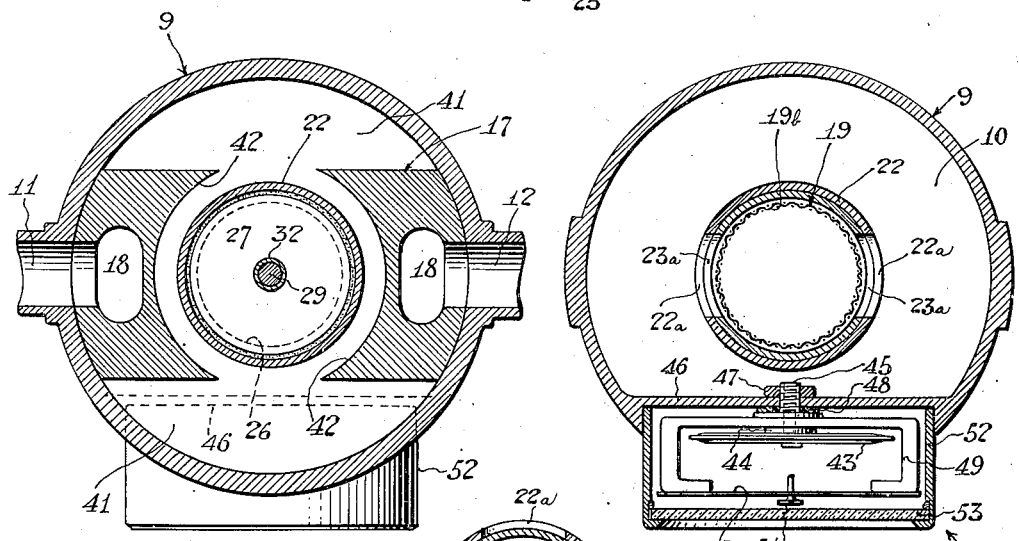
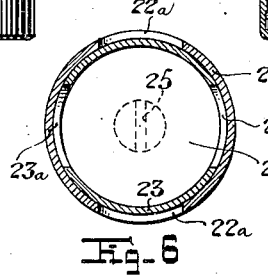
INVENTOR
CLYDE B. GARDENIER
By Henry Lanahan
ATTORNEY Patented Oct. 11, 1949

2,484,217

UNITED STATES PATENT OFFICE 2,484,217

GAS FLOW APPARATUS

Clyde B. Gardenier, Belleville, N. J., assignor to Thomas A. Edison, Incorporated, West Orange, N. J., a corporation of New Jersey Application February 28, 1946, Serial No. 650,778

10 Claims. (Cl. 128—191)

This invention relates particularly to improvements in respiratory apparatus of the rebreathing—i. e., closed cycle—type, and more particularly to a novel testing device adapted especially for use with respiratory apparatus for measuring the percentage content of carbon dioxide in respiratory gases.

It is an object of my invention to provide a novel and improved testing device of economical construction which will enable direct measurements to be made, at will, of the percentage content of a constituent of the gases in respiratory or other apparatus without interfering with the normal functioning of that apparatus.

My invention utilizes the principle, itself well known, of capturing a sample of gases in a sealed chamber, absorbing out a constituent of those gases, and measuring the percentage of that constituent in terms of the degree of vacuum produced as the constituent is absorbed. It is an object of my invention to provide a device utilizing this principle which is adapted to enable the percentage content of carbon dioxide in rebreathing apparatus to be measured quickly and accurately while maintaining the apparatus in functioning order.

It is another object to provide a testing device of the character mentioned which is very simple to use and which is easy to maintain in working condition.

Other and allied objects and features of my invention will more fully appear from the following description and the appended claims.

In the description of my invention reference is had to the accompanying drawings, of which:

Figure 3 is an axially sectional view of that testing device;

Figure 4 is a horizontal section taken substantially on the line 4—4 of Figure 3;

Figure 5 is a horizontal section taken substantially on the line 5—5 of Figure 3; and Figure 6 is a horizontal fractional section taken substantially on the line 6—6 of Figure 3.

My invention provides an improved and improvements in respiratory apparatus of the closed-cycle type, and is herein particularly described in terms of such apparatus. In such apparatus the exhaled gases are passed through a unit containing a carbon dioxide absorbent, preferably Baralyme as described in my Patent No. 2,322,206, to remove the carbon dioxide before the gases are again inhaled. To the inhaled gases are added oxygen and/or other gases, depending upon the particular needs of the patient. The carbon dioxide absorbents become, however, ineffective after a normal period of use and have to be replaced at intervals by a fresh absorbent in order to keep the gases free of carbon dioxide. Because the presence of carbon dioxide in rebreathing apparatus can be very dangerous to the patient—it being known that only small percentages may produce toxic effects and only a few per cent may produce narcosis—there has been adopted the practice of replacing the carbon dioxide absorbent after relatively short periods of use in an effort to assure that the absorbent in use will always be in effective condition. This practice has been not only wasteful in the use of the carbon dioxide absorbent, but it does not assure absolute safety because the absorbent may inadvertently not be replaced as intended with the result that the patient may suffer from the accumulation of carbon dioxide in the system before it is known that the absorbent has lost its effectiveness.

Figure 1:
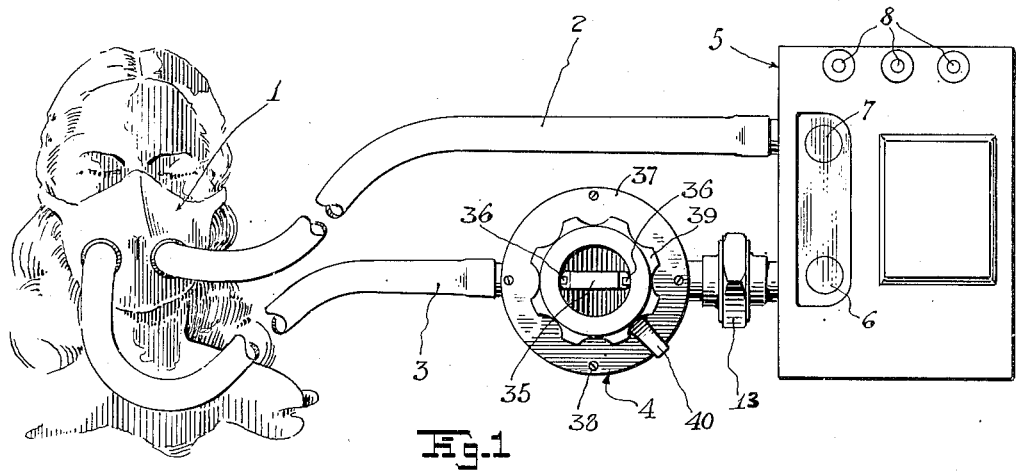
Figure 1 is a diagrammmatic view of a rebreathing apparatus incorporating my invention.

By my invention the patient or the attendant therefor may quickly measure the percentage of carbon dioxide in the respiratory gases at intervals, as desired. This is illustrated in terms of a rebreathing type of anaesthetizing apparatus shown in Figure 1. This apparatus comprises a mask 1 for attachment to the patient, inlet and outlet tubes 2 and 3 leading to and from the mask, a carbon dioxide testing unit 4 connected to one of these tubes, preferably the outlet tube 3, and an anaesthetizing machine 5, diagrammatically shown, which is connected between the outlet of the testing unit 4 and the inlet tube 2. The anaesthetizing machine 5 includes a reconditioning unit typically in the form of a canister which contains a carbon dioxide absorbent through which the respiratory gases are passed to extract from them the carbon dioxide. At the inlet and outlet openings of the machine 5 there are poppet valves 6 and 7 the former of which opens during exhalation and the latter during inhalation to direct the gas flow unidirectionally through the closed passageway of the system. Additionally, the machine 5 may include a spirometer attached to a suitable bellows, and manually-controlled valves 8 for adding different gases to the passageway of the system, say ether, oxygen, etc., together with suitable gauges. It will be understood though that this apparatus, including the reconditioning unit above referred to, is standard in the art and need not be shown in the present application.

The testing unit 4 comprises a cylindrical container 9 having therein a testing chamber 10. This container is provided near the top thereof with diametrically-opposite inlet and outlet openings 11 and 12 of which the former is connected to the tube 3 and the latter is connected by a union 13 (Figure 1) to the anaesthetic machine 5. Below the openings 11 and 12 the container has an internal flange 14 provided with openings 15 and 16 that are adjacent to the inlet and outlet openings 11 and 12 respectively. Rotatably fitting the upper portion of the container above the flange 14 is a valve 17 having a bottom face which lies flat against the flange 14. This valve has a pair of diametrically-opposite ducts 18 which lead inwardly from the periphery thereof and then downwardly through the bottom face thereof. In the position of the valve shown in Figure 3—which is its so-called "operating" position indicated in Figure 2—one of the ducts 18 registers with the inlet opening 11 and the opening 15 in the flange 14 and the other duct 18 registers with the opening 16 in the flange and with the outlet opening 12. Thus in this position of the valve the testing chamber 10 is interposed in the passageway of the respiratory apparatus.

Within the testing chamber 10 there is a cylindrical cartridge 19 comprising for example a flanged circular base 19a, a tubular screen 19b connected thereto and a flanged rim 19c for reenforcing the screen at the top. This cartridge is filled with a carbon dioxide absorbent 20, preferably pellets of Baralyme hereinbefore mentioned. In order though that this absorbent will not be exposed to the gases in the testing chamber while the testing device is not in use, there is provided a substantially airtight housing 21 around the cartridge 19 which seals it from the surrounding space of the testing chamber while the valve 17 is in its operating position abovementioned.

The housing 21 comprises a tubular member 22 which extends axially through the valve 17 to nearly the bottom of the chamber 10, the tubular housing member having a press fit in a central opening of the valve so that it has an airtight seal with the valve and is carried thereby, and a stationary tubular member 23 which is concentric to the member 22 and which fits snugly the inner wall of the latter. The housing member 23 extends throughout the height of the testing chamber and is mounted on a base 24 that is interlocked at 25 (Figure 3) with the bottom wall of the container 9. These tubular housing members 22 and 23 have pairs of diametrically-opposite openings 22a and 23a respectively. In the operating position of the valve, however, these openings are out of registry with one another as shown in Figure 6 so that the absorbent 20 is then closed off from the gases circulating through the testing chamber.

Above the cartridge 19 there is an interior flange 26 in the housing member 22 which forms a seat for a cap 27 that is spring-pressed tightly thereagainst to seal the cartridge chamber from the atmosphere. To render this seal airtight there is a gasket 28, as of rubber, secured to the cap 27 and interposed between the cap and the flange 26. The sealing pressure is applied to the cap through a central upstanding post 29 thereof by means of a compression spring 30 which is interposed between the end of the post and an inner end wall 31 of a tubular member 32 that telescopes on the post, the member 32 being locked to the post by a cross pin 33 but having slots 34 engaged by the pin to afford it an axial freedom of movement relative to the cap 27. Locked to the top part of the member 32 is a cross bar 35 which bridges the housing tube 22 and which has projecting ends 35a adapted to catch beneath respective pins 36 provided in the housing member 22. When the bar is locked below these pins the spring 30 is under compression to hold the cap closed. To remove the cap it is only necessary to depress the bar 35 slightly, then turn it to free it from the pins 36 and next withdraw it from the housing member 22.

Figure 2:
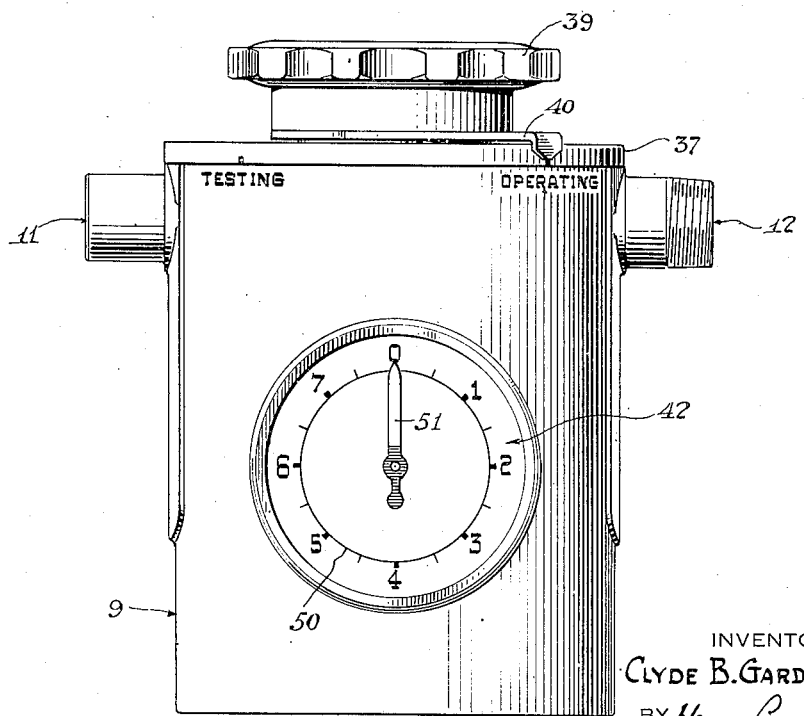
Figure 2 is an elevational view of the testing device of that apparatus.

On the top of the container 9 there is an annular cover plate 37 held in place by screws 38. Mounted on a portion of the tubular housing member 22 which projects above the cover plate 37 is a knob 39 adapted to be gripped by the hand to turn the valve 17. This knob carries a pointer 40 which has an end thereof bent downwardly around the upper edge of the container to indicate the operating and testing positions of the valve as shown in Figure 2.

In the valve 17 there are two segmentally-shaped ducts 41 which lead through the periphery of the valve and are opposite one another on a diameter line that is at right angles to that through the ducts 18. The ducts 41 intercommunicate by way of arcuate passageways 42 around the tubular housing member 22 but do not lead out through the top or bottom walls of the valve. As the valve is turned to its testing position—which is approximately 90° from its operating position above described—the ducts 41 are moved into registration with the inlet and outlet openings 11 and 12 and at the same time the openings 15 and 16 in the flange 14 are closed by the bottom wall of the valve. Thus, in the testing position of the valve the same provides a by-pass for the passageway of the rebreathing apparatus around the testing chamber and seals the chamber closed. By providing this by-pass the rebreathing apparatus is maintained in operating condition during a testing operation. In order that the chamber will be absolutely airtight during a testing operation the interfaces of the valve and container are covered with a suitable grease or oil.

Since the valve 17 carries the housing member 22, this member 22 is turned likewise through approximately 90° by the movement of the valve to its testing position. By this movement of the housing member the openings 22a and 23a are brought into registration with one another so as to expose the carbon dioxide absorbent 20 to the gases which are trapped in the testing chamber. As the carbon dioxide of the gases in the chamber contacts this absorbent it reacts rapidly therewith and is extracted from the gases. The extraction of the carbon dioxide sets up gas currents within the testing chamber which causes all of the gas to contact rapidly the absorbent and to hasten the extracting process.

The extraction of the carbon dioxide from the trapped gases reduces the density of these gases and produces a partial vacuum in the testing chamber. This vacuum is measured by a gauge of any suitable variety preferably a gauge 42 employing a capsule 43 as indicated in Figure 5. Such a capsule may comprise two thin-walled diaphragms sealed together at their edges, one of which has a mounting boss at the center thereof through which extends an exteriorly-threaded tube 45. This tube projects through an opening in a flat interior partitioning wall 46 of the container 9 to place the capsule in communication with the testing chamber 10, the tube being secured to the wall 46 by a nut 47 threaded on the end thereof. To provide an airtight seal between the tube and the wall there is a gasket 48 clamped between the boss 44 and the wall 46 under pressure of the nut 47. Also clamped between the boss 44 and the wall 46 is a U-frame 49 which carries a dial 50, a centrally pivoted pointer 51 and suitable mechanism which couples the pointer to the outer diaphragm of the capsule. Such coupling mechanism however need not be herein shown since it may be of any standard variety adapted to produce a turning movement of the pointer as the outer diaphragm is moved in response to a reduction in the pressure inside the capsule. Surrounding the gauge components is a cylindrical case 52 that is fitted into an opening of the container 9 against the wall 46. Mounted in this case in the outer end thereof is a glass 53 for rendering visible the dial 50 and pointer 51. The dial 50 is calibrated so that the pointer 51 will indicate correctly the percentage of carbon dioxide in the gases entrapped in the testing chamber, the calibration running suitably from one to seven per cent as shown in Figure 2.

In summary, the testing device 4 is used as follows: Normally the valve 17 is left in its operating position so that the gases of the rebreathing apparatus are passed through the testing chamber 10. During this time the carbon dioxide absorbent 20 is out of contact with these gases and the atmosphere so that it is maintained in its effective condition. When it is desired to make a test of the percentage content of carbon dioxide in the gases of the rebreathing system the operator need simply turn the valve 17 to its testing position. As this is done the testing chamber 10 is closed, the passageway of the rebreathing apparatus is by-passed around the chamber 10 and the absorbent 20 is exposed to the gases entrapped in the chamber 10. The needle then begins to deflect in response to the decreasing internal pressure of the testing chamber caused by the extraction of the carbon dioxide and will come to a stabilized position to indicate directly the percentage content of carbon dioxide as soon as the dioxide is substantially all absorbed. After the reading is taken the valve 17 is returned to its operating position so that the sample of gas last tested is driven from the chamber and replaced by the respiratory gases of the system to enable another test to be made as desired.

While my invention contemplates a novel respiratory system and has particular utility in connection with such systems, it will be understood that no unnecessary limitation of my invention to such systems is intended because my invention, in its broader aspects, may have general applications to systems having a passageway for the substantially continuous flow of mixed gases wherein it is desired to measure at intervals the percentage content of a constituent of those gases. Also, it will be understood that modifications and changes may be made in the construction of the particular apparatus herein described without departing from the scope of my invention, which I endeavor to express according to the following claims.

I claim:

1. A respiratory apparatus having a closed passageway for the respiratory gases and comprising a device provided with a testing chamber, means associated with said device for measuring the percentage of carbon dioxide in the gases within said chamber, a unitary valve mounted on said device and movable into first and second positions, said valve being adapted to interpose said chamber in said passageway when the valve is in said first position, and said valve comprising means effective when the valve is in said second position to provide a by-pass for said passageway around said chamber and concurrently to seal said chamber closed whereby a sample of the respiratory gases is collected in said chamber for measurement of the percentage carbon dioxide therein by said measuring means, and means controlled by said valve to place said measuring means into inoperative and operative conditions as said valve is moved into said first and second positions respectively.

2. In a respiratory apparatus comprising a mask, inlet and outlet tubes leading to and from said mask, a reconditioning unit for the respiratory gases connected between said tubes and means for causing unidirectional flow of the respiratory gases through said tubes: a gas-testing device connected to said apparatus and comprising a gas-testing chamber, means for measuring a constituent of the gas in said chamber, and a unitary valve means movable into one position to interpose said chamber in the passageway of said apparatus and into a second position to provide a by-pass for said passageway around said chamber and concurrently to seal said chamber closed whereby a sample of the respiratory gases is collected for analysis.

3. In a closed rebreathing system: a gas-testing device comprising a testing chamber, means for measuring a constituent of the gases in said chamber, and a selectively-operable valve movable into one position to interpose said chamber in the passageway of said system and into a second position to provide a by-pass for said passageway around said system and concurrently to seal said chamber closed.

4. In apparatus for measuring the percentage of a constituent of gases, comprising a testing chamber, an absorbent for said constituent and a vacuum gauge connected to said chamber: the combination of a substantially fluid-tight housing located in said chamber for separating said absorbent from the gases in said chamber, said housing comprising two telescoping tubes respectively having openings registrable with one another when the tubes are in predetermined relative positions; and means connected to said tubes and operable for moving the same into said predetermined relative positions to open the housing and expose said absorbent to said gases.

5. In apparatus having a passageway for gases: a device for measuring at will the percentage of a constituent of said gases comprising a testing chamber, an absorbent for said constituent, a vacuum gauge connected to said chamber, a housing for said absorbent openable to expose the absorbent to the gases in said chamber, a by-pass for said passageway around said testing chamber, and valve means movable into first and second positions respectively, said valve means being rendered effective as it is moved into said first position to include serially said chamber in said passageway and concurrently to close said by-pass and including means effective when said valve means is in said second position to open said by-pass and concurrently to seal said chamber closed, and means coupled to said valve means and operated concurrently as said valve means is moved into said first and second positions for closing and opening said housing respectively.

6. In apparatus including a passageway for gases, a testing chamber, an absorbent for a constituent of said gases, and a vacuum gauge connected to said chamber: the combination of a by-pass around said chamber for said passageway, a valve controlling said by-pass and passageway movable into first and second positions respectively, said valve being adapted when in said first position to close said by-pass and connect said passageway by way of said chamber and when in said second position to open said by-pass and concurrently to seal said chamber closed, and means coupled to said valve for causing said absorbent to be exposed to the gases in said chamber only when the valve is in its said second position.

7. In apparatus including a passageway for gases, a testing chamber, an absorbent for a constituent of said gases, and a vacuum gauge connected to said chamber: the combination of a by-pass around said chamber for said passageway, a valve controlling said by-pass and passageway movable into first and second positions respectively, said valve being adapted when in said first position to close said by-pass and connect said passageway by way of said chamber and when in said second position to open said by-pass and concurrently to seal said chamber closed, a substantially airtight housing for said absorbent openable to expose the absorbent to the gases in said chamber, and means coupled to said valve for closing and opening said housing as said valve is moved into its said first and second positions respectively.

8. In apparatus having a passageway for the flow of mixed gases, a testing chamber, an absorbent in said chamber for a constituent of said gases and a vacuum gauge connected to said chamber: the combination of a housing for said absorbent located in said chamber and openable to expose said absorbent to the gases within the chamber, a valve selectively operable to interpose said chamber in said passageway or to by-pass said passageway around said chamber and concurrently seal the chamber closed, and means coupled to said valve for closing the housing when the chamber is interposed in said passageway and to open the housing when the chamber is closed.

9. The combination set forth in claim 8 wherein said housing comprises two concentric tubular members having openings therein, said tubular members slidably fitting one another and being relatively movable to place said openings into and out of registration with each other.

10. In apparatus having a passageway for gases comprising carbon dioxide, a testing chamber, an absorbent for said carbon dioxide, and a vacuum gauge connected to said chamber: the combination of a cylindrical housing in said chamber for said absorbent comprising two concentric interengaging tubes having openings placeable into and out of registration with one another to open and close the housing upon imparting a relative movement between said tubes, a fixed mounting for one of said tubes, a rotatable valve for said chamber movable into a first position to interpose the chamber in said passageway and into a second position to by-pass the passageway around said chamber and concurrently seal the chamber closed, and means connecting the second one of said tubes to said valve for causing said housing to be closed when the valve is in said first position and to be open when the valve is in said second position.

CLYDE B. GARDENIER.

REFERENCES CITED

The following references are of record in the file of this patent:

UNITED STATES PATENTS

| Number | Name | Date |
|---|---|---|
| 1,033,626 | Schroder et al. | July 23, 1912 |
| 2,136,236 | Draper | Nov. 8, 1938 |

FOREIGN PATENTS

| Number | Country | Date |
|---|---|---|
| 10,753 | Great Britain | Aug. 5, 1887 |